United States Patent
Lee

(10) Patent No.: US 9,798,009 B2
(45) Date of Patent: Oct. 24, 2017

(54) METHOD AND APPARATUS FOR ACQUIRING SIGNAL OF GLOBAL NAVIGATION SATELLITE SYSTEM

(71) Applicant: SAMSUNG ELECTRONICS CO., LTD., Suwon-si (KR)

(72) Inventor: Jeong-sang Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 939 days.

(21) Appl. No.: 14/092,006

(22) Filed: Nov. 27, 2013

(65) Prior Publication Data

US 2014/0300514 A1   Oct. 9, 2014

(30) Foreign Application Priority Data

Dec. 5, 2012   (KR) .................. 10-2012-0140545

(51) Int. Cl.
   *G01S 19/30*   (2010.01)
   *G01S 19/24*   (2010.01)
   *G01S 5/10*    (2006.01)
   *G01S 19/05*   (2010.01)
   *G01S 19/09*   (2010.01)

(52) U.S. Cl.
   CPC .............. *G01S 19/05* (2013.01); *G01S 19/09* (2013.01)

(58) Field of Classification Search
   CPC ............................. G01S 19/30; G01S 19/254
   USPC ............ 342/357.63, 357.69, 357.71, 357.78; 701/467, 468
   See application file for complete search history.

(56) References Cited

U.S. PATENT DOCUMENTS

| | | | |
|---|---|---|---|
| 6,366,599 B1 | 4/2002 | Carlson et al. | |
| 7,479,924 B2 | 1/2009 | Jia et al. | |
| 7,710,317 B2* | 5/2010 | Cheng | G01S 19/25 342/357.64 |
| 2009/0224973 A1* | 9/2009 | Nayyar | G01S 19/29 342/357.42 |
| 2009/0295631 A1 | 12/2009 | Wu et al. | |
| 2012/0056781 A1* | 3/2012 | Kong | G01S 19/252 342/357.42 |
| 2012/0076177 A1 | 3/2012 | Simic et al. | |

OTHER PUBLICATIONS

Chang, et al; "Adaptive logic control approach for fast GNSS acquisition"; Electronics Letters; Jun. 19, 2008; vol. 44; No. 13; 2 pgs.

Chang, et al; "Application of Genetic Control with Adaptive Scaling Scheme to Signal Acquisition in Global Navagation Satellite System Receiver"; Algorithms; Feb. 17, 2012; vol. 5; pp. 56-75.

(Continued)

*Primary Examiner* — Dao Phan
(74) *Attorney, Agent, or Firm* — Sughrue Mion, PLLC

(57) ABSTRACT

A method and an apparatus for acquiring a signal of a global navigation satellite system (GNSS) are provided. The method includes: performing a first satellite signal acquiring operation based on an initially set Doppler frequency search start value and an initially set Doppler frequency search interval value; and changing the initially set Doppler frequency search start value and performing a second satellite signal acquiring operation when a satellite signal is not found through the first satellite signal acquiring operation.

8 Claims, 8 Drawing Sheets

(56) References Cited

OTHER PUBLICATIONS

D.J.R. Van Nee, et al.; "New Fast GPS Code-Acquistion Technique Using FFT"; Electronics Letters; Jan. 17, 1991; vol. 27; No. 2; pp. 158-160.
D. Akopian;I "Fast FFT based GPS satellite acquisition methods"; IEE Procedings, Radar Sonar and Navigation; Aug. 5, 2005; vol. 152; No. 4; pp. 277-286.

\* cited by examiner

METHOD AND APPARATUS FOR ACQUIRING SIGNAL OF GLOBAL NAVIGATION SATELLITE SYSTEM

CROSS-REFERENCE TO RELATED APPLICATION

This application claims the benefit of Korean Patent Application No. 10-2012-0140545, filed on Dec. 5, 2012, in the Korean Intellectual Property Office, the disclosure of which is incorporated herein in its entirety by reference.

BACKGROUND

The inventive concept relates to a method and an apparatus for processing a signal in a satellite signal receiving system, and more particularly, to a method and an apparatus for acquiring a signal of a global navigation satellite system (GNSS).

A global navigation satellite system (GNSS) is a series of systems which check a position of a target and provides visual information by using a plurality of satellites and receiving equipment on the ground.

The GNSS may include the Global Positioning System (GPS) operated by the United States, a Global Orbiting Navigation Satellite System (GLONASS) operated by Russia, a Galillean location tracing system that will be established by the EU, etc. The GNSS performs an operation of acquiring a satellite signal, thus conducting research for reducing a time required for acquiring a satellite signal to improve a performance of the GNSS.

SUMMARY

The inventive concept provides a method and an apparatus for acquiring a signal of a global navigation satellite system (GNSS) to reduce a time required for acquiring a satellite signal in the GNSS.

According to an aspect of the inventive concept, there is provided a method of acquiring a signal of a global navigation satellite system (GNSS), including: performing a first satellite signal acquiring operation based on an initially set Doppler frequency search start value and an initially set Doppler frequency search interval value; and changing the initially set Doppler frequency search start value and performing a second satellite signal acquiring operation when a satellite signal is not found through the first satellite signal acquiring operation.

In the second satellite signal acquiring operation, a Doppler frequency search interval value applied to the first satellite signal acquiring operation may be maintained.

The first and second satellite signal acquiring operations may be performed in a 2-dimensional (2D) search area formed of a Doppler frequency and a code delay.

The changing of the initially set Doppler frequency search start value may include: changing the initially set Doppler frequency search start value by ½ of the initially set Doppler frequency search interval value.

The method may further include: changing the initially set Doppler frequency search interval value and performing a third satellite signal acquiring operation when the satellite signal is not found through the second satellite signal acquiring operation.

The initially set Doppler frequency search start value may be applied in the third satellite signal acquiring operation.

The performance of the first satellite signal acquiring operation may include: calculating satellite signal search values according to a correlation between a Doppler frequency and a code delay at each interval in the 2-dimensional (2D) search area based on the initially set Doppler frequency search start value and the initially set Doppler frequency search interval value; and determining that the satellite signal has been successfully detected when a maximum value of the calculated satellite signal search values satisfies an initially set first condition.

The initially set first condition may include at least one of a condition in which a difference between a maximum value and a second great value of the calculated satellite signal search values exceeds an initially set first threshold value and a condition in which the maximum value exceeds an initially set second threshold value.

The method may further include: determining whether the number of satellites that performs the first satellite signal acquiring operation to then have succeeded in finding a satellite signal satisfies a second condition exceeding an initially set third threshold value, wherein, if the second condition is satisfied when a satellite signal of a target satellite is not found through the first satellite signal acquiring operation, the initially set Doppler frequency search start value may be changed to perform the second satellite signal acquiring operation, and if the second condition is not satisfied, the initially set Doppler frequency search interval value may be changed to perform the second satellite signal acquiring operation.

According to another aspect of the inventive concept, there is provided an apparatus for acquiring a signal of a global navigation satellite system (GNSS), including: a controller which generates control signals for respectively determining a Doppler frequency search start value and a Doppler frequency search interval value; a satellite signal acquiring processor which calculates satellite signal search values according to a correlation between a Doppler frequency and a code delay at each search interval based on the control signals; and a determiner which determines whether a satellite signal has been successfully detected based on the calculated satellite signal search values, wherein when the detection of the satellite signal fails through a satellite signal acquiring operation based on an initially set Doppler frequency search start value and an initially set Doppler frequency search interval value, the controller may generate control signals for changing the Doppler frequency search start value and maintaining the Doppler frequency search interval value.

When the detection of the satellite signal fails through a satellite signal acquiring operation based on an initially Doppler frequency search start value and an initially set Doppler frequency search interval value, the controller may generate a control signal for changing the Doppler frequency search start signal by ½ of the initially set Doppler frequency search interval value.

When at least one of a condition in which a difference between a maximum value and a second great value of the calculated satellite signal search values exceeds an initially set first threshold value and a condition in which the maximum value exceeds an initially set second threshold value is satisfied, the determiner may determine that the satellite signal has been successfully detected.

The satellite signal acquiring processor may include: a local oscillator which generates a locally oscillating signal whose frequency is shifted, based on the control signals; a code generator which generates a code signal whose phase is delayed, based on the control signals; a phase shifter which a phase of a locally oscillating signal generated by the local oscillator; first and second mixers which respectively mix the locally oscillating signal and the locally oscillating signal whose phase is 90° shifted, with an input signal; third and fourth mixers which mix signals output from the first and second mixers with a code signal generated by the code generator; first and second integrators which respectively integrate signals output from the third and fourth mixers for an accumulation section; first and second square operation units which respectively square values integrated by the first and second integrators; and a summer which sums values calculated by the first and second square operation units.

The accumulation section may be determined in inverse proportion to a size of the Doppler frequency search interval value.

If the detection of the satellite signal fails in the satellite signal acquiring operation performed by changing the Doppler frequency search start value, the controller may generate control signals for changing the initially set Doppler frequency search interval value and determining the Doppler frequency search start value as an initially set value.

According to another aspect of the inventive concept, there is provided a method of acquiring a signal from a satellite system, the method comprising changing an initially set Doppler frequency start value; and performing a satellite signal acquiring operation.

The performing operation may be performed only when an earlier acquiring operation with a different Doppler frequency start value has failed.

According to another aspect of the inventive concept, there is provided an apparatus for acquiring a signal from a satellite system, the apparatus comprising a controller which generates control signals for determining a Doppler frequency search start value.

The controller may generate control signals for changing the Doppler frequency search start value while maintaining the Doppler frequency search interval value.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
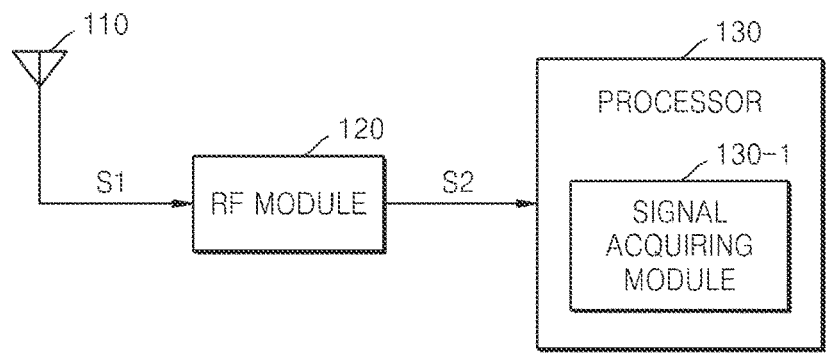
FIG. 1 is a schematic block diagram illustrating a global navigation satellite system (GNSS) receiver according to an exemplary embodiment of the inventive concept.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements, and thus their description will be omitted.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic block diagram illustrating a global navigation satellite system (GNSS) receiver according to an exemplary embodiment of the inventive concept.

As shown in FIG. 1, the GNSS receiver includes an antenna 110, a radio frequency (RF) module 120, and a processor 130.

As an example, the GNSS receiver of FIG. 1 may be mounted in terminals adopting a GNSS service function, such as mobile terminals, notebook PCs, personal digital assistants (PDAs), smart phones, portable media player (PMPs), and navigation devices.

The antenna 110 receives a signal from a GNSS satellite.

The RF module 120 receives a GNSS signal S1 from the GNSS satellite through the antenna 110. The RF module 120 amplifies the GNSS signal S1 and filters noise from the GNSS signal S1. The RF module 120 converts the filtered GNSS signal into an intermediate frequency signal and converts a GNSS analog signal converted into the intermediate frequency signal into a digital GNSS signal S2.

The processor 130 receives the digital GNSS signal S1 converted into the intermediate frequency signal. The processor 130 uses the digital GNSS signal S2 converted into the intermediate frequency signal to acquire and trace a satellite signal, extract navigation data, and calculate a position of the GNSS receiver. For example, acquiring of the satellite signal may be performed by a signal acquiring module 130-1 of the processor 130.

The signal acquiring module 130-1 calculates satellite signal search values according to a correlation between a Doppler frequency and a code delay at each search interval in a 2-dimensional (2D) search area of a Doppler frequency delay axis and a code delay axis from the GNSS signal S2 converted into the intermediate frequency signal. For example, the signal acquiring module 130-1 calculates the satellite signal search values according to the correlation between the Doppler frequency and the code delay based on an initially set Doppler frequency search start value and an initially set Doppler frequency search interval value. An operation of acquiring the satellite signal may be performed sequentially according to codes of a plurality of satellites.

The signal acquiring module 130-1 determines whether the satellite signal has been successfully detected, based on the calculated satellite signal search values.

For example, if a difference between a maximum value and a second great value of the calculated satellite signal search result values exceeds an initially set first threshold value, the signal acquiring module 130-1 determines that the satellite signal has been successfully detected.

As another example, if the maximum value of the calculated satellite signal search result values exceeds an initially set second threshold value, the signal acquiring module 130-1 determines that the satellite signal has been successfully detected.

If the detection of the satellite signal fails in the satellite signal acquiring operation based on the initially set Doppler frequency search start value and the initially set Doppler frequency search interval value, the signal acquiring module 130-1 may change a Doppler frequency search start value and maintain a Doppler frequency search interval value as an initially set value to perform the satellite signal acquiring operation.

For example, if the detection of the satellite signal fails in the satellite signal acquiring operation based on the initially set Doppler frequency search start value and the initially set Doppler frequency search interval value, the signal acquiring module 130-1 may change the initially set Doppler frequency search start value by ½ of the initially set Doppler frequency search interval value and then re-perform the satellite signal acquiring operation.

If the detection of the satellite signal fails in the satellite signal acquiring operation performed based on the changed Doppler frequency search start value, the signal acquiring module 130-1 may change the initially set Doppler frequency search interval value and then re-perform the satellite signal acquiring operation. The initially set Doppler frequency search interval value may be lowered to re-perform the satellite signal acquiring operation. For example, the initially set Doppler frequency search interval value may be lowered to ½ to re-perform the satellite signal acquiring operation.

If the detection of the satellite signal fails in the satellite signal acquiring operation performed based on the changed Doppler frequency search start value, the signal acquiring module 130-1 may change the initially set Doppler frequency search interval value and use an initially set value as a Doppler frequency search start value.

For example, if the number of satellites which have succeeded in finding the satellite signal through the satellite signal acquiring operation based on the initially set Doppler frequency search start value and the initially set Doppler frequency search interval value exceeds an initially set third threshold value, the signal acquiring module 130-1 may change the initially set Doppler frequency search start value to re-perform the satellite signal acquiring operation when a satellite signal of a target satellite is not found through the satellite signal acquiring operation in an initially set condition.

If the number of satellites which have succeeded in finding a satellite signal through the satellite signal acquiring operation based on the initially set Doppler frequency search start value and the initially set Doppler frequency search interval value does not exceed the initially set third threshold value, the signal acquiring module 130-1 may change the initially set Doppler frequency search interval value to re-perform the satellite signal acquiring operation when the satellite signal of the target satellite is not found through the satellite signal acquiring operation in the initially set condition.

Figure 2:
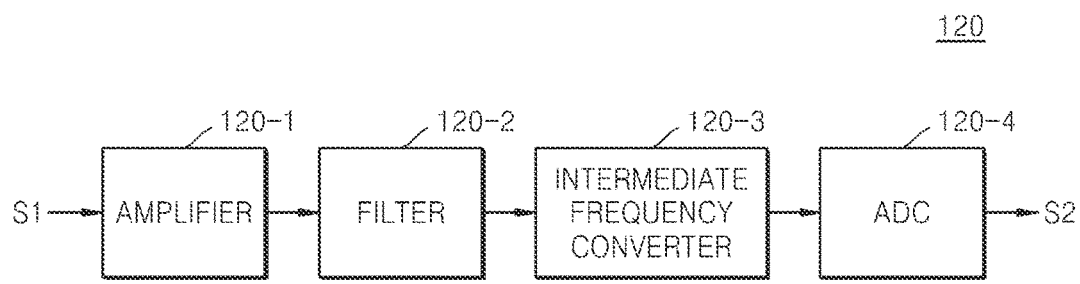
FIG. 2 is a block diagram illustrating a structure of a radio frequency (RF) module 120 of FIG. 1, according to an exemplary embodiment of the inventive concept.

FIG. 2 is a block diagram illustrating a structure of the RF module 120 of FIG. 1, according to an exemplary embodiment of the inventive concept.

As shown in FIG. 2, the RF module 120 includes an amplifier 120-1, a filter 120-2, an intermediate frequency converter 120-3, and an analog-to-digital converter (ADC) 120-4.

The amplifier 120-1 receives the GNSS signal S1 through the antenna 110 and amplifies the GNSS signal S1 to a signal intensity with respect to which analog/digital conversion processing is possible.

The filter 120-2 limits a bandwidth through which a signal passes, to remove noise. For example, a band pass filter (BPF) may be used as the filter 120-2.

The intermediate frequency converter 120-3 performs frequency conversion processing for converting a GNSS signal of a high frequency input from the filter 120-2 into a GNSS signal having an intermediate frequency.

The ADC 120-4 converts an analog GNSS signal converted into the intermediate frequency signal into a digital GNSS signal S2. In other words, the ADC 120-4 may convert an intermediate frequency (IF) analog GNSS signal into an IF digital GNSS signal S2 by using the predetermined number of bits and a predetermined sampling frequency.

Figure 3:
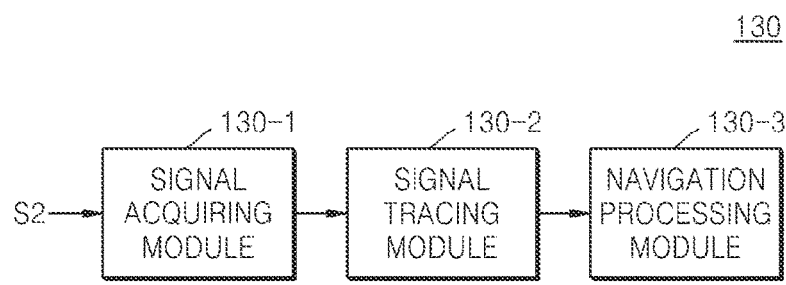
FIG. 3 is a block diagram illustrating a structure of a processor 130 of FIG. 1, according to an exemplary embodiment of the inventive concept.

FIG. 3 is a block diagram illustrating a structure of the processor 130 of FIG. 1, according to an exemplary embodiment of the inventive concept.

As shown in FIG. 3, the processor 130 includes the signal acquiring module 130-1, a signal tracing module 130-2, and a navigation processing module 130-3.

The signal acquiring module 130-1 performs a function as described with reference to FIG. 1. A detailed structure of the processor 130-1 will be described in detail below.

The signal tracing module 130-2 determines an initial value of a signal tracing loop based on a Doppler frequency and a code phase in which the signal acquiring module 130-1 has succeeded in acquiring a satellite signal. The signal tracing module 130-2 traces a Doppler frequency and a code phase varying as time passes.

The navigation processing module 130-3 extracts a navigation message from a code acquired from a received GNSS signal and decodes the extracted navigation message to generate track information of a satellite and navigation data for correcting a delay error. The navigation processing module 130-3 finally calculates a position and a speed of the GNSS receiver by using the navigation data.

The structure of the signal acquiring module 130-1 shown in FIGS. 1 and 3 will now be described in detail.

Figure 4:
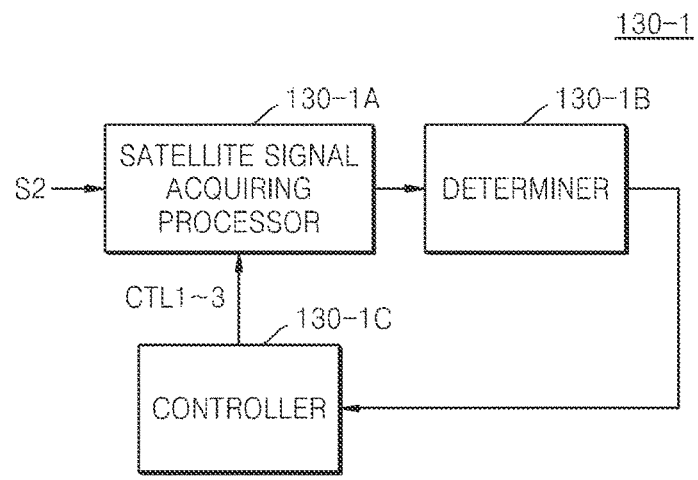
FIG. 4 is a block diagram illustrating a structure of a signal acquiring module 130-1 of FIGS. 1 and 3, according to an exemplary embodiment of the inventive concept.

FIG. 4 is a block diagram illustrating the structure of the signal acquiring module 130-1 of FIGS. 1 and 3, according to an exemplar embodiment of the inventive concept.

As shown in FIG. 4, the signal acquiring module 130-1 includes a satellite signal acquiring processor 130-1A, a determiner 130-1B, and a controller 130-1C.

The satellite signal acquiring processor 130-1A receives the digital GNSS signal S2 converted into the intermediate frequency signal from the RF module 120. The satellite signal acquiring processor 130-1A calculates satellite signal search values from the digital GNSS signal S2 according to a correlation between a Doppler frequency and a code delay at each search interval in a 2D search area based on control signals. The control signals may be generated by the controller 130-1C. For example, the control signals may respectively determine a Doppler frequency search start value and a Doppler frequency search interval value. The satellite signal acquiring operation may be performed according to identification codes of satellites.

Figure 6:
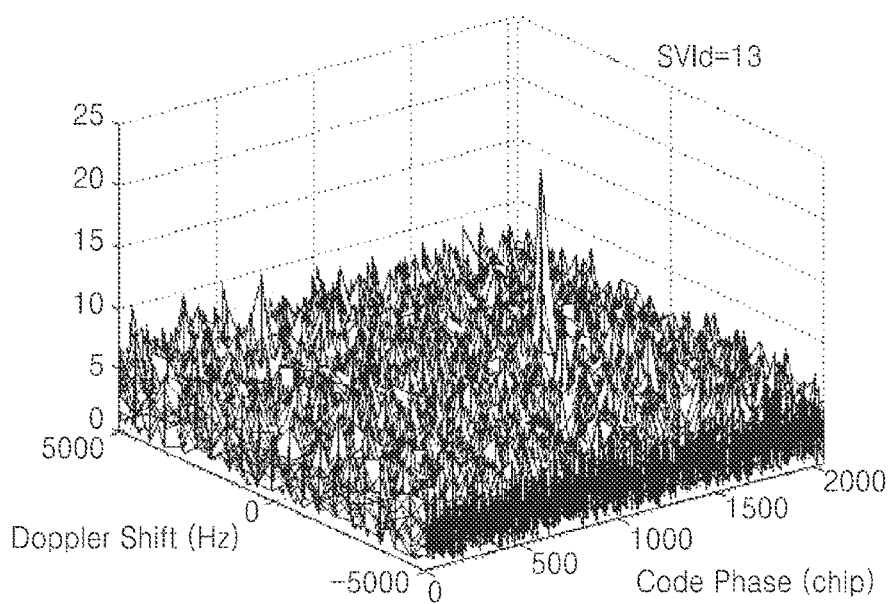
FIG. 6 is a graph illustrating satellite signal search values which are calculated by the satellite signal acquiring processor 130-1A and expressed on a 2-dimensional (2D) lattice.

For example, as shown in FIG. 6, the satellite signal acquiring processor 130-1A may generate satellite signal search values at each search interval in a 2D search area formed of a Doppler frequency shift axis and a code phase delay axis.

The determiner 130-1B determines whether a satellite signal has been successfully detected, based on the satellite signal search values calculated by the satellite signal acquiring processor 130-1A. For example, if the determiner 130-1B satisfies at least one of a condition in a difference between a maximum value and a second great value of the satellite signal search values exceeds a preset first threshold value and a condition in which the maximum value exceeds a preset second threshold value, the determiner 130-1B may determine that the satellite signal has been successfully detected. The determiner 130-1B outputs determination information about whether the satellite signal has been successfully detected, to the controller 130-1C.

The controller 130-1C generates control signals CTL1 and CTL2 for respectively determining the Doppler frequency search start value and the Doppler frequency search interval value, based on the determination information received from the determiner 130-1B.

The controller 130-1C generates a control signal CTL3 for sequentially delaying a code phase within a predetermined range at each Doppler frequency search interval.

For example, the controller 130-1C generates control signals CTL1 and CTL2 for respectively determining the Doppler frequency search start value and the Doppler frequency search interval value as initially set values in an initial satellite signal acquiring operation.

If a detection of a satellite signal fails in a satellite signal acquiring operation based on an initially set Doppler frequency search start value fo and an initially set Doppler frequency search interval value Δf, the controller 130-1C changes the initially set Doppler frequency search start value fo and generates control signals for maintaining a Doppler frequency search interval value as an initially set value. Therefore, when the Doppler frequency search start value is changed, and the Doppler frequency search interval value is maintained as the initially set value, the satellite signal acquiring operation is performed again.

For example, if the detection of the satellite signal fails in the satellite signal acquiring operation based on the initially set Doppler frequency search start value fo and the initially set Doppler frequency search interval value Δf, the controller 130-1C may generate a control signal CTL1 for changing the Doppler frequency search start value by ½ of the initially set Doppler frequency search interval value Δf. In other words, if the detection of the satellite signal fails in the satellite signal acquiring operation based on the initially set Doppler frequency search start value fo and the initially set Doppler frequency search interval value Δf, the controller 130-1C may generate a control signal CTL1 for changing the Doppler frequency search start value to (fo+Δf/2) or (fo−Δf/2).

For example, a change range of the Doppler frequency search start value may be determined within a range smaller than the Doppler frequency search interval value Δf.

If the detection of the satellite signal fails in the satellite signal acquiring operation when the Doppler frequency search start value is changed, and the Doppler frequency search interval value is maintained as the initially set value, the controller 130-1C may generate control signals for changing the initially set Doppler frequency search interval value Δf and maintaining the Doppler frequency search start value as the initially set value. Therefore, when the Doppler frequency search start value is maintained as the initially set value, and the initially set Doppler frequency search interval value is changed, the satellite signal acquiring operation is performed again. For example, the initially set Doppler frequency search interval value Δf may be lowered to re-perform the satellite signal acquiring operation. The initially set Doppler frequency search interval value Δf may be lowered to ½ to perform the satellite signal acquiring operation again.

For example, if the number of satellites, which have succeeded in finding the satellite signal through the satellite signal acquiring operation based on the initially set Doppler frequency search start value fo and the initially set Doppler frequency search interval value Δf, exceeds an initially set third threshold value, the controller 130-1C may generate a control signal CTL1 for changing the initially set Doppler frequency search start value fo when a satellite signal of a target satellite is not found through the satellite signal acquiring operation in an initially set condition. Therefore, when the Doppler frequency search start value is changed, and the Doppler frequency search interval value is maintained as the initially set value, the satellite signal acquiring operation is performed again.

For example, if the number of satellites, which have succeeded in finding the satellite signal through the satellite signal acquiring operation based on the initially set Doppler frequency search start value fo and the initially set Doppler frequency search interval value Δf, does not exceed the initially set third threshold value, the controller 130-1C may generate a control signal CTL2 for changing the initially set Doppler frequency search interval value Δf when the satellite signal of the target satellite is not found through the satellite signal acquiring operation in the initially set condition. Therefore, when the Doppler frequency search interval value is changed, and the Doppler frequency search start value is maintained as an initially set value, the satellite signal acquiring operation is performed again.

Figure 5:
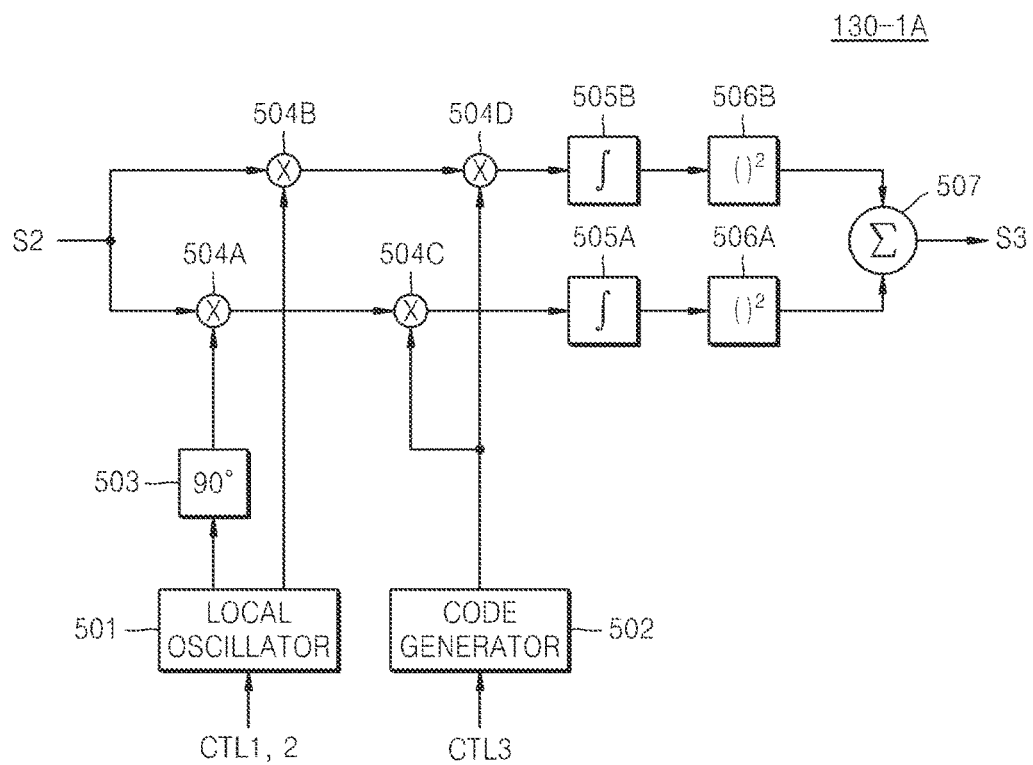
FIG. 5 is a view illustrating a detailed structure of a satellite signal acquiring processor 130-1A of FIG. 4, according to an exemplary embodiment of the inventive concept.

FIG. 5 is a view illustrating a detailed structure of the satellite signal acquiring processor 130-1A of FIG. 4, according to an exemplary embodiment of the inventive concept.

As shown in FIG. 5, the satellite signal acquiring processor 130-1A includes a local oscillator 501, a code generator 502, a phase shifter 503, first through fourth mixers 504A through 504D, first and second integrators 505A and 505B, first and second square operation units 506A and 506B, and a summer 507.

The local oscillator 501 generates a locally oscillating signal, of which locally oscillating frequency is shifted, based on control signals CTL1 and CTL2. The local oscillator 501 generates a locally oscillating signal whose frequency is shifted by an initially set Doppler frequency search start value. The local oscillator 501 sequentially generates a locally oscillating signal whose frequency is shifted by a Doppler frequency search interval value.

The code generator 502 generates a code signal whose phase is delayed, based on a control signal CTL3. For example, the code signal may be a Pseudo Random Noise (PRN) code signal. The code generator 502 generates a code signal whose phase is sequentially delayed within a predetermined range at each Doppler frequency search interval. The code signal has an identification code thereof according to each satellite.

Therefore, as shown in FIG. 6, a shifted locally oscillating signal and a phase delayed code signal may be generated to generate satellite signal search values at each search interval in a 2D search area formed of a Doppler frequency shift axis and a code phase delay axis.

A phase of the shifted locally oscillating signal generated by the local oscillator 501 is 90° shifted by the phase shifter 503.

The second mixer 504B mixes a digital GNSS signal S2 converted into an intermediate frequency signal with the locally oscillating signal generated by the local oscillator 501. The first mixer 504A mixes the digital GNSS signal S2 converted into the intermediate frequency signal with the locally oscillating signal whose phase is 90° shifted.

The fourth mixer 504D mixes an output signal of the second mixer 504B with the code signal generated by the code generator 502. The third mixer 504C mixes an output signal of the first mixer 504A with the code signal generated by the code generator 502.

The second integrator 505B integrates a signal output from the fourth mixer 504D for a preset accumulation section. The first integrator 505A integrates a signal output from the third mixer 503D for the preset accumulation section. For example, the preset accumulation section may be determined along with a Doppler frequency search interval. The preset accumulation section may be determined in proportion to the Doppler frequency search interval. In detail, if the Doppler frequency search interval is set to 1 KHz, the preset accumulation section may be determined as 1 msec. If the Doppler frequency search interval is set to 500 Hz, the preset accumulation section may be determined as 2 msec.

The first square operation unit 506A squares a signal output from the first integrator 505A. The second square operation unit 506B squares a signal output from the second integrator 505B.

The summer 507 sums an output signal of the first square operation unit 506A and output signal of the second square operation unit 506B.

An input signal S2 of the satellite signal acquiring processor 130-1A of FIG. 5 may be expressed as y(t) as in Equation 1 below:

$$y(t) = r(t) + \eta(t) \quad (1)$$
$$= D(t - t_d) \cdot C_r(t - t_d) \cdot \exp(-j2\pi(f_{IF} + f_d)(t - t_d)) + \eta(t - t_d)$$

wherein D denotes navigation data, $C_r$ denotes a reference code, $t_d$ denotes a code phase delay, $f_{IF}$ denotes an IF frequency, $f_d$ denotes a Doppler frequency shift, and η denotes noise.

An output signal of the summer 507 may be expressed as y'(t) as in Equation 2 below:

$$y'(t) = \int_{nT} D(t - t_d) \cdot C_r(t - t_d) \cdot C_l(t - t_p) \cdot \exp(-j2\pi f_d)(t - t_d) dt + \quad (2)$$
$$\int_{nT} \eta(t - t_d) \cdot C_l(t - t_p) dt$$

wherein $\underline{C}_l$ denotes a local code, and $t_p$ denotes a code phase offset.

Referring to Equation 2 above, if the code phase delay and the Doppler frequency offset value are found, and the accumulation section increases, a value of a first item increases, and a second item converges to 0 since there is no correlation between noise and a local code. However, the accumulation section increases, an interval between Doppler frequency offsets to be searched for in a search area is reduced, and thus processing is complicated. Here, the interval between the Doppler frequency offsets refers to a Doppler frequency search interval. This is because an accumulated value is used as a representative value for a corresponding time in terms of a signal acquiring operation characteristic and thus becomes equal to a sampling effect. In other words, the increase in the accumulation section means that a sampling rate is lowered.

For example, the satellite signal acquiring processor 130-1A of FIG. 5 operate in a search area in which a Doppler frequency offset range is set between −5 KHz and +5 KHz, and a code phase delay range is set between 0 and 1,023 chips (1,023 chips; 1 ms). For example, the Doppler frequency search interval has an inverse value of the accumulation section. In other words, if the accumulation section is 1 ms, the Doppler frequency search interval has an interval of 1 KHz. Also, a code phase search interval may be set to have ½ chip or ¼ chip.

As another example, if the accumulation section is set to 2 ms, and the Doppler frequency search interval (Doppler frequency offset spacing) is set to 500 Hz, satellite search values are output from the summer 507 at each search interval in the 2D search area. Examples of satellite signal search values of satellite ID (SVId) 13 in the above-described search condition are shown in FIG. 6.

Referring to FIG. 4 again, the determiner 130-1B searches for a maximum value of satellite signal search values based on one side axis of the 2D search area. For example, the determiner 130-1B searches for the maximum value based on a code phase axis and then searches for the maximum value based on a Doppler frequency axis.

Figure 7:
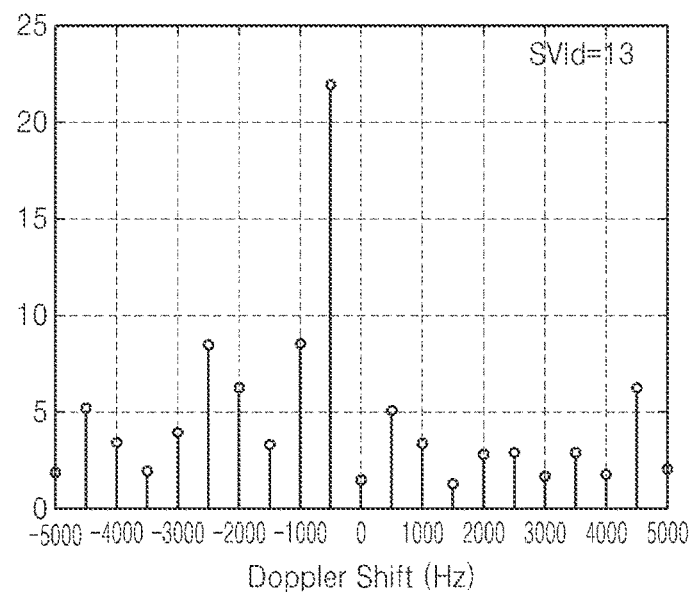
FIG. 7 is a graph illustrating satellite signal search values on a Doppler frequency shift axis if acquiring of a satellite signal have succeeded based on an initially set Doppler frequency search start value and an initially set Doppler frequency search interval value.

FIG. 7 is a graph illustrating satellite signal search values on a Doppler frequency shift axis when a satellite signal has been successfully acquired based on an initially set Doppler frequency search start value and an initially set Doppler frequency search interval value. FIG. 7 illustrates an example of a satellite signal search result on a Doppler frequency shift axis when a code phase is correct in a search for satellite ID (SVId) 13.

Figure 8A:
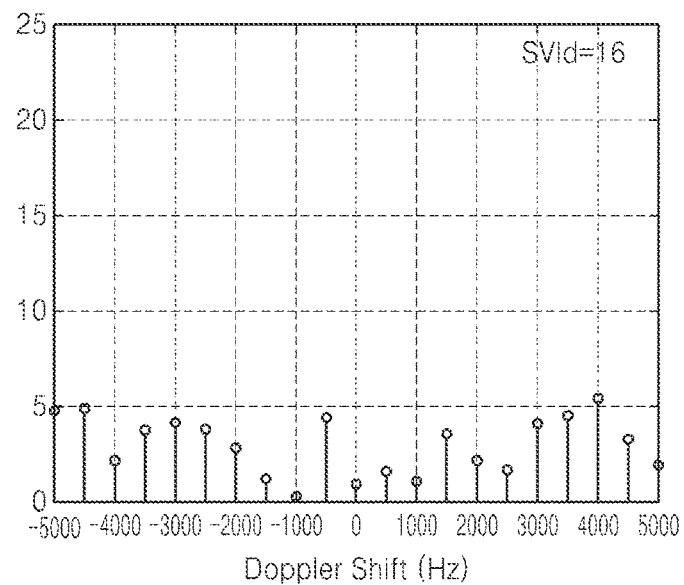
FIG. 8A is a graph illustrating satellite signal search values on a Doppler frequency shift axis if acquiring of a satellite signal fails based on an initially set Doppler frequency search start value and an initially set Doppler frequency search interval value.

FIG. 8A is a graph illustrating satellite signal search values on a Doppler frequency shift axis when acquiring of a satellite signal fails based on an initially set Doppler frequency search start value and an initially set Doppler frequency search interval value. FIG. 8A illustrates an example of a satellite signal search result on a Doppler frequency shift axis when a code phase is not correct in a search for satellite ID (SVId) 16.

Referring to FIG. 8A, satellite signal search values detected in all Doppler frequency search intervals are distributed around a noise level. Therefore, FIG. 8A illustrates that acquiring of the satellite signal fails.

Figure 8B:
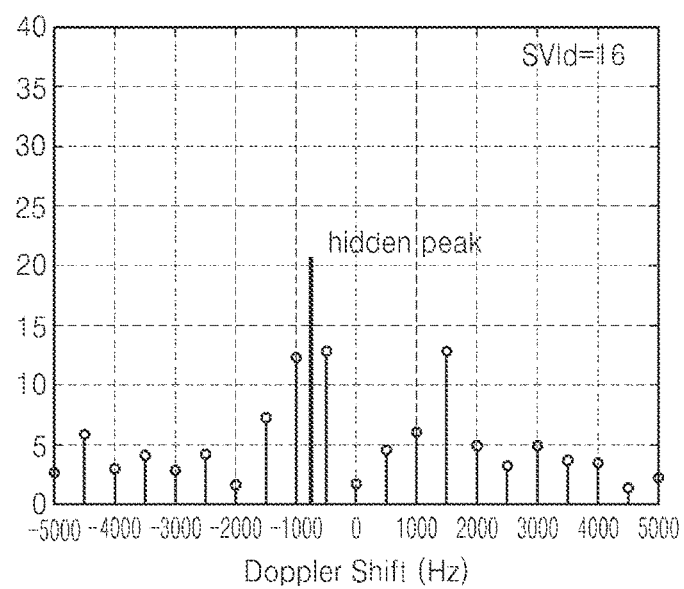
FIG. 8B is a graph illustrating a peak of a satellite signal search value hidden between Doppler frequency offset bins if acquiring of a satellite signal fails based on an initially set Doppler frequency search start value and an initially set Doppler frequency search interval value.

FIG. 8B is a graph illustrating a peak of a satellite signal search value hidden between Doppler frequency offset bins when acquiring of a satellite signal fails based on an initially set Doppler frequency search start value and an initially set Doppler frequency search interval value.

Referring to FIG. 8B, when acquiring of the satellite signal fails based on the initially set Doppler frequency search start value and the initially set Doppler frequency search interval value, and an accumulation section is increased, a satellite signal hidden between Doppler frequency search intervals is detected. In other words, when a Doppler frequency search interval is reduced to perform a satellite signal acquiring process, the peak of the satellite signal search value hidden between the Doppler frequency offset bins is detected as shown in FIG. 8B. Therefore, when the satellite signal acquiring process is performed after the Doppler frequency search interval is reduced, a satellite signal has been successfully acquired.

Figure 9:
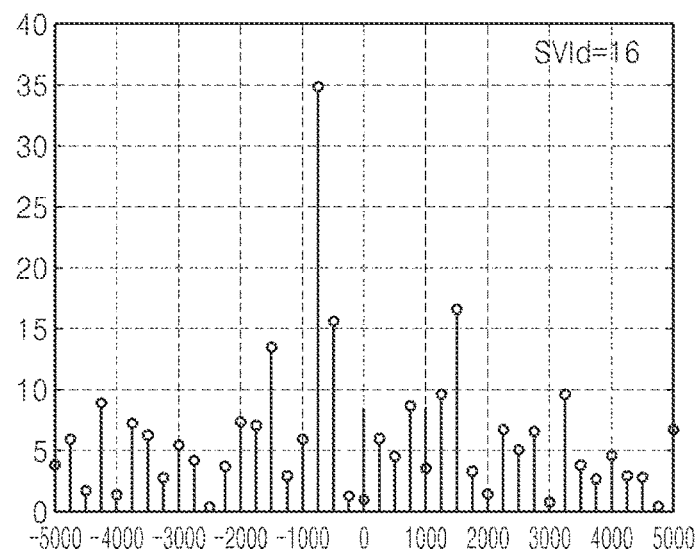
FIG. 9 is a graph illustrating a peak of a satellite signal search value found between Doppler frequency offset bins by reducing a Doppler frequency search interval value to ½.

FIG. 9 is a graph illustrating a peak of a satellite signal search value found between Doppler frequency offset bins by reducing a Doppler frequency search interval value $\Delta f$ to ½.

A time for increasing an accumulation section and reducing a Doppler frequency search interval to perform a satellite signal acquiring process is 4 times longer than a time for performing a satellite signal acquiring process based on an initially set Doppler frequency search start value and an initially set Doppler frequency search interval value. In other words, the accumulation section is 2 times required, and the number of Doppler frequency offset bins is 2 times required. The number of accesses to a memory is 2 times generated.

In the exemplary embodiment of the inventive concept, when acquiring of a satellite signal fails based on an initially set Doppler frequency search start value and an initially set Doppler frequency search interval value, the initially set Doppler frequency search interval value is maintained, and the initially set Doppler frequency search start value is changed to re-perform a satellite signal acquiring operation. For example, after the initially set Doppler frequency search start value is changed by ½ of the initially set Doppler frequency search interval value, the satellite signal acquiring operation may be performed again. In this case, a hidden peak of a satellite signal may be found without changing an accumulation section and a Doppler frequency search interval value $\Delta f$.

Figure 10:
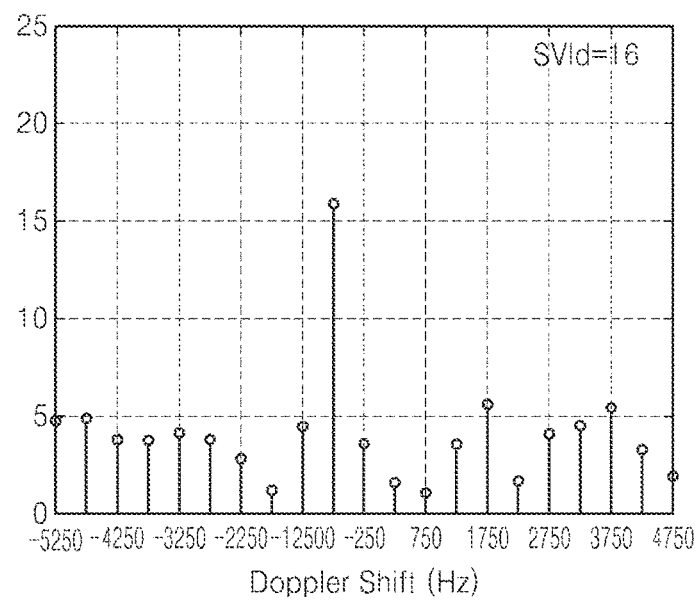
FIG. 10 is a graph illustrating a peak of a satellite signal search value found between Doppler frequency offset bins by changing an initially set Doppler frequency search start value with maintaining an initially set Doppler frequency search interval, according to an exemplary embodiment of the inventive concept.

FIG. 10 is a graph illustrating a peak value of a satellite signal search value found between Doppler frequency offset bins by maintaining an initially set Doppler frequency search interval and changing an initially set Doppler frequency search start value according to an exemplary embodiment of the inventive concept.

Referring to FIG. 10, the initially set Doppler frequency search interval value is maintained at 500 Hz, and the initially set Doppler frequency search start value is changed from −5000 Hz to −5250 Hz to find the peak value of the satellite signal search value between the Doppler frequency offset bins.

A satellite signal acquiring method performed by the signal acquiring module 130-1 through a control operation of the controller 130-1C of FIG. 4 according to an exemplary embodiment of the inventive concept will now be described with reference to FIG. 11.

In operation S110, the signal acquiring module 130-1 performs a first satellite signal acquiring operation according to a 2D search for a Doppler frequency and a code delay based on an initially set Doppler frequency search start value fo and an initially set Doppler frequency search interval value $\Delta f$. The first satellite signal acquiring operation may be performed according to codes of satellites.

In operation S120, the signal acquiring module 130-1 determines whether a satellite signal has been successfully detected through the first satellite signal acquiring operation.

If the detection of the satellite signal fails through the first satellite signal acquiring operation, the signal acquiring module 130-1 maintains the initially set Doppler frequency search interval value $\Delta f$ and changes the initially set Doppler frequency search start value fo, and perform a second satellite signal acquiring operation in operation S130. In other words, the initially set Doppler frequency search interval value $\Delta f$ and a changed Doppler frequency search start value fo' are applied to perform a second satellite signal acquiring operation. For example, the Doppler frequency search start value fo' obtained by changing the initially set Doppler frequency search start value fo by ½ of the initially set Doppler frequency search interval value $\Delta f$ is applied to perform the second satellite signal acquiring operation. In other words, the changed Doppler frequency search start value fo' may be (fo+$\Delta f$/2) or (fo−$\Delta f$/2).

If it is determined in operation S120 that the detection of the satellite signal has succeeded through the first satellite signal acquiring operation, the process is ended. In other words, a signal acquiring operation for a corresponding satellite code is ended.

Figure 11:
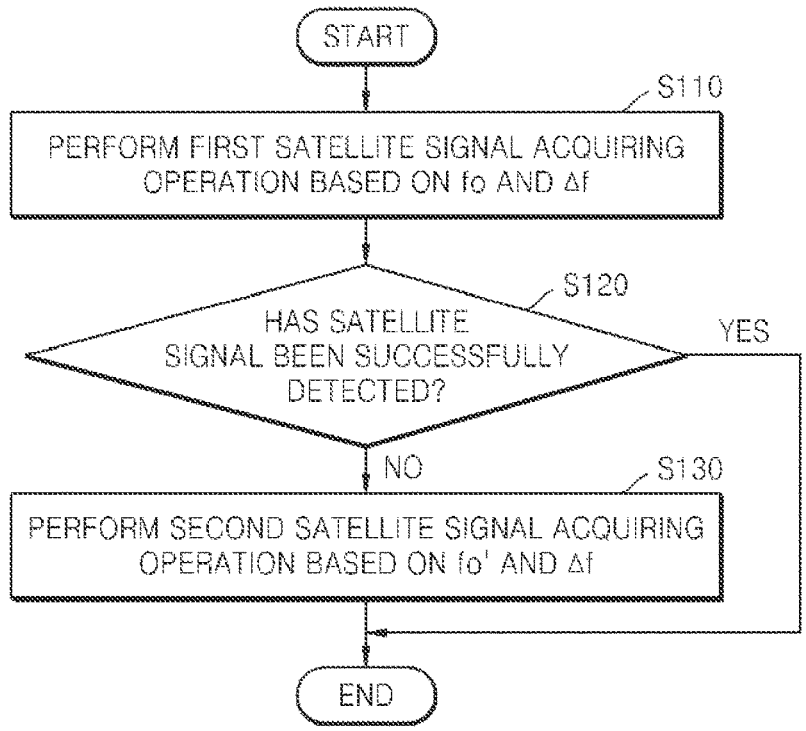
FIG. 11 is a flowchart illustrating a method of acquiring a satellite signal according to an exemplary embodiment of the inventive concept.
Figure 12:
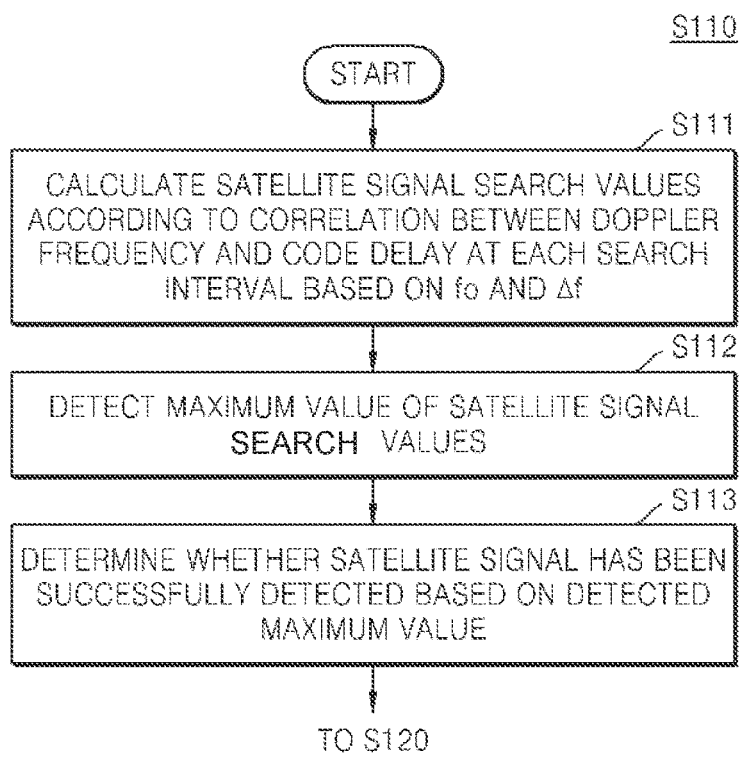
FIG. 12 is a detailed flowchart illustrating a first satellite signal acquiring operation S110 of FIG. 11, according to an exemplary embodiment of the inventive concept.

FIG. 12 is a detailed flowchart illustrating the first satellite signal acquiring operation S110 of FIG. 11, according to an exemplary embodiment of the inventive concept.

In a satellite signal search value calculating operation S111, the signal acquiring module 130-1 calculates satellite signal search values according to a correlation between a Doppler frequency and a code delay at each search interval based on an initially set Doppler frequency search start value fo and an initially set Doppler frequency search interval value Δf. For example, satellite signal search values may be calculated from the satellite signal acquiring processor 130-1A of FIG. 5 by using a shifted locally oscillating signal and a phase-delayed code signal in a 2D search area formed of a Doppler frequency shift axis and a code delay axis as shown in FIG. 6.

In a maximum value detecting operation S112, the signal acquiring module 130-1 detects a maximum value from the satellite signal search values calculated in the satellite signal search value calculating operation S111. For example, the signal acquiring module 130-1 may find a maximum value based on the code delay axis and then may find a maximum value based on the Doppler frequency axis. As another example, the signal acquiring module 130-1 may find a maximum value based on the Doppler frequency axis and then may find a maximum value based on the code delay axis.

In a satellite signal detection success determining operation S113, the signal acquiring module 130-1 determines whether a satellite signal has been successfully detected based on the detected maximum value. For example, the signal acquiring module 130-1 may determine whether the detected maximum value is recognized as a satellite signal not as noise. Also, the signal acquiring module 130-1 may determine whether the satellite signal has been successfully detected based on an absolute size of the detected maximum value. As another example, the signal acquiring module 130-1 may determine whether the satellite signal has been successfully detected based on a relative size of the detected maximum value with respect to a noise level.

Figure 13:
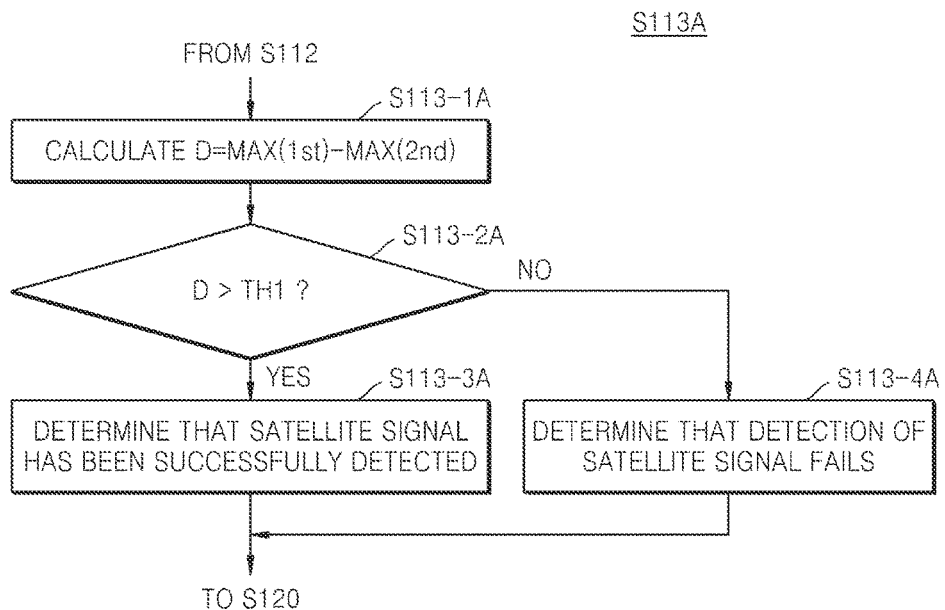
FIG. 13 is a detailed flowchart illustrating a satellite signal acquisition determining operation S113 of FIG. 12, according to an exemplary embodiment of the inventive concept.

FIG. 13 is a detailed flowchart illustrating the satellite signal detection success determining operation S113 of FIG. 12, according to an exemplary embodiment of the inventive concept.

In a difference calculating operation S113-1A, the signal acquiring module 130-1 calculates a difference D between a maximum value MAX(1st) and a second great value MAX(2nd) of the satellite signal search values.

In a first threshold value access determining operation S113-2A, the signal acquiring module 130-1 determines whether the difference D exceeds an initially set first threshold value TH1. For example, the initially set first threshold value TH1 may be determined as a value that a difference between the detected maximum value and the second great value may be recognized as the satellite signal not as noise, through a test.

If it is determined in the first threshold value access determining operation S113-2A that the difference D exceeds the initially set first threshold value TH1, the signal acquiring module 130-1 determines that the satellite signal has been successfully detected.

If it is determined in the first threshold value access determining operation S113-2A that the difference D does not exceed the initially set first threshold value TH1, the signal acquiring module 130-1 determines that the detection of the satellite signal fails in operation S113-4A.

Figure 14:
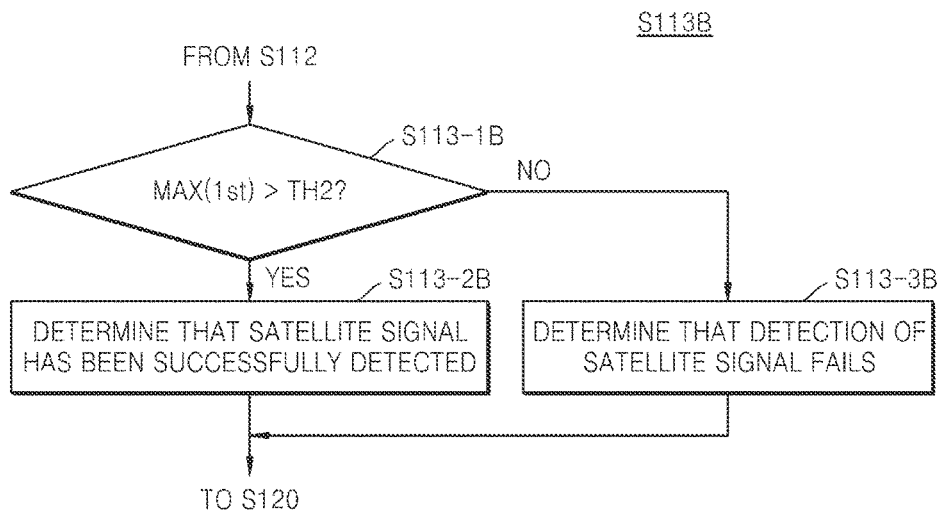
FIG. 14 is a detailed flowchart illustrating the satellite signal acquisition determining operation S113 of FIG. 12, according to another exemplary embodiment of the inventive concept.

FIG. 14 is a detailed flowchart illustrating the satellite signal detection success determining operation S113 of FIG. 12, according to another exemplary embodiment of the inventive concept.

The signal acquiring module 130-1 determines whether the maximum value MAX(1st) of the satellite signal search values exceeds an initially set second threshold value TH2 in operation S113-1B. For example, the initially set second threshold value TH2 may be determined as a value that the detected maximum value may be recognized as a satellite signal not as noise, through a test. The second threshold value TH2 may be determined as a value greater than the first threshold value TH1.

If it is determined in a second threshold value access determining operation S113-1B that the maximum value MAX(1st) exceeds the initially set second threshold value TH2, the signal acquiring module 130-1 determines that the satellite signal has been successfully detected in a satellite signal detection success determining operation S113-2B.

If it is determined in the second threshold value access determining operation S113-1B that the maximum value MAX(1st) does not exceed the initially set second threshold value TH2, the signal acquiring module 130-1 determines that the detection of the satellite signal fails in operation S113-3B.

Figure 15:
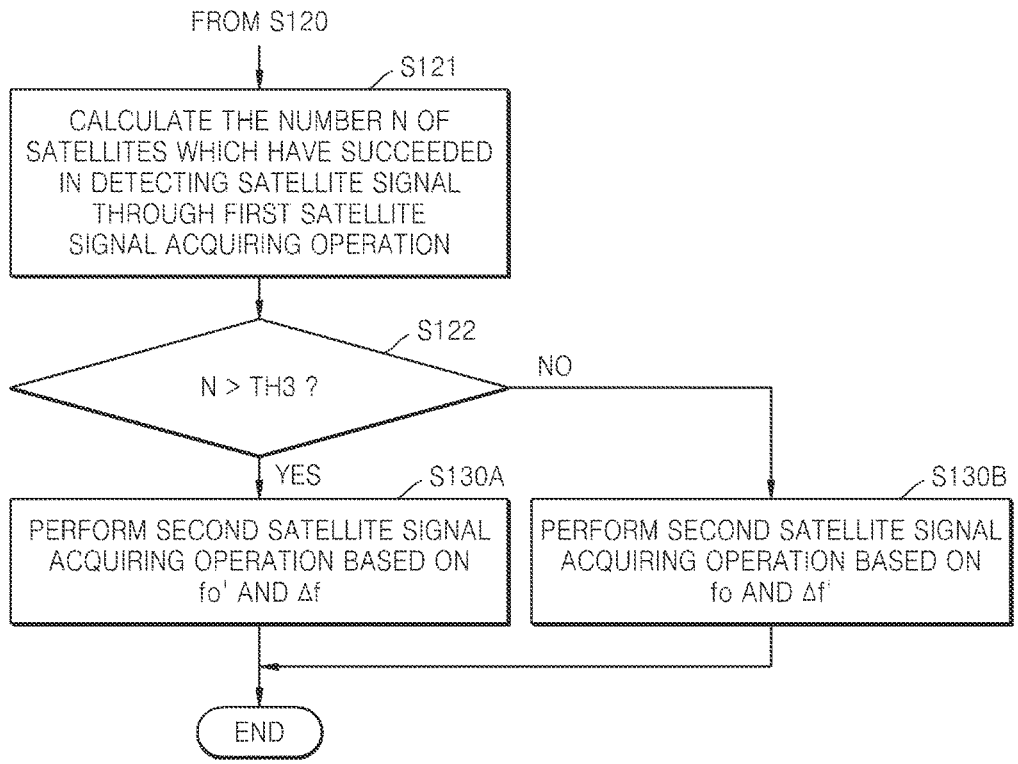
FIG. 15 is a detailed flowchart illustrating a satellite signal acquisition performing operation S130 of FIG. 11, according to another exemplary embodiment of the inventive concept.

FIG. 15 is a detailed flowchart illustrating a satellite signal acquiring operation S130 of FIG. 11, according to another exemplary embodiment of the inventive concept.

If a detection of a signal of a satellite having a corresponding identification code fails through the first satellite signal acquiring operation, the signal acquiring module 130-1 calculates the number N of satellites which have succeeded in detecting the satellite signal through the first satellite signal acquiring operation in a satellite number calculating operation S121.

In a third threshold value access determining operation S122, the signal acquiring module 130-1 determines whether the number N of satellites which have succeeded in detecting the satellite signal exceeds an initially set third threshold value TH3 through the first satellite signal acquiring operation. The third threshold value TH3 may be determined based on the minimum number of satellites used in navigation processing. For example, the third threshold value TH3 may be set to the number of satellites which have succeeded in acquiring a signal. Here, there is a high probability that the satellites will be estimated as having succeeded in detecting a signal based on an intensity of a signal received from a current satellite.

If it is determined in the third threshold value access determining operation S122 that the number N of satellites which have succeeded in detecting the satellite signal exceeds the initially set threshold value TH3 through the first satellite signal acquiring operation, the signal acquiring module 130-1 maintains an initially set Doppler frequency search interval value Δf and changes an initially set Doppler frequency search start value fo to perform a second satellite signal acquiring operation in a second satellite signal acquiring operation S130A. In other words, the initially set Doppler frequency search interval value Δf and a changed Doppler frequency search start value fo' are applied to perform the second satellite signal acquiring operation. For example, the Doppler frequency search start value fo' obtained by changing the initially set Doppler frequency search start value fo by ½ of the initially set Doppler frequency search interval value Δf may be applied to perform the second satellite signal acquiring operation.

If it is determined in the third threshold value access determining operation S122 that the number N of satellites which have succeeded in detecting the satellite signal is lower than or equal to the initially set third threshold value TH3 through the first satellite signal acquiring operation, the signal acquiring module 130-1 maintains the initially set Doppler search start value fo and changes the initially set Doppler frequency search interval value Δf to perform the second satellite signal acquiring operation in another second satellite signal acquiring operation S130B. For example, a Doppler frequency search interval value Δf obtained by lowering the initially set Doppler frequency search interval value Δf to ½ may be applied to perform the second satellite signal acquiring operation.

Figure 16:
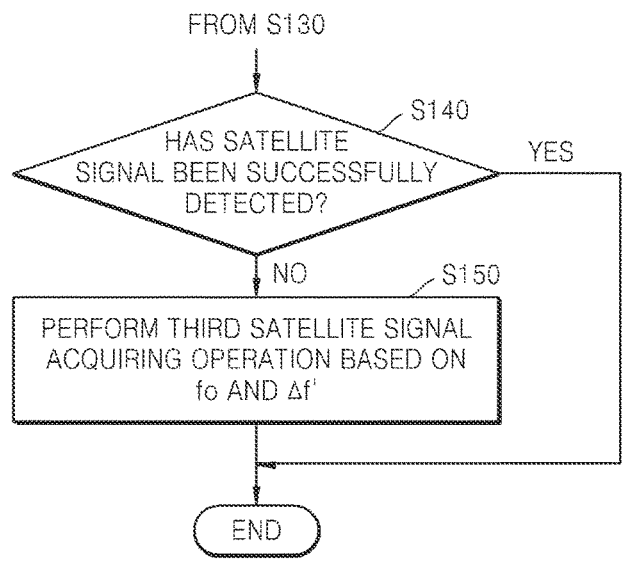
FIG. 16 is a flowchart illustrating the method of FIG. 11 further including a third satellite signal acquiring operation, according to an exemplary embodiment of the inventive concept.

FIG. 16 is a flowchart illustrating the method of FIG. 11 further including a third satellite signal acquiring operation, according to an exemplary embodiment of the inventive concept.

After the signal acquiring module 130-1 ends the second satellite signal acquiring operation S130 of FIG. 11, the signal acquiring module 130-1 determines whether a satellite signal has been successfully detected through the second satellite signal acquiring operation in a satellite signal detection success determining operation S140.

If it is determined in the satellite signal detection success determining operation S140 that the detection of the satellite signal fails through the second satellite signal acquiring operation, the signal acquiring module 130-1 performs a third satellite signal acquiring operation based on the initially set Doppler frequency search start value fo and the changed Doppler frequency search interval value Δf in a third satellite signal acquiring operation S150. For example, the changed Doppler frequency search interval value Δf may be a value obtained by lowering the initially set Doppler frequency search interval value Δf to ½.

If it is determined in the satellite signal detection success determining operation S140 that the satellite signal has been successfully detected through the second satellite signal acquiring operation, the process is ended. In other words, a signal acquiring operation for a corresponding satellite code is ended.

Although not shown in the drawings, even if acquiring of the satellite signal fails through the third satellite signal acquiring operation, at least one of a Doppler frequency search start value and a Doppler frequency search interval value may be changed to perform a fourth or more satellite signal acquiring operation.

While the inventive concept has been particularly shown and described with reference to exemplary embodiments thereof, it will be understood that various changes in form and details may be made therein without departing from the spirit and scope of the following claims.

What is claimed is:

1. An apparatus for acquiring a signal from a global navigation satellite system (GNSS), the apparatus comprising:
a controller which generates control signals for respectively determining a Doppler frequency search start value and a Doppler frequency search interval value;
a satellite signal acquiring processor which calculates satellite signal search values according to a correlation between a Doppler frequency and a code delay at each search interval based on the control signals; and
a determiner which determines whether a satellite signal has been successfully detected based on the calculated satellite signal search values,
wherein when the detection of the satellite signal fails through a satellite signal acquiring operation based on an initially set Doppler frequency search start value and an initially set Doppler frequency search interval value, the controller generates control signals for changing the Doppler frequency search start value and maintaining the Doppler frequency search interval value.

2. The apparatus of claim 1, wherein when the detection of the satellite signal fails through the satellite signal acquiring operation based on the initially Doppler frequency search start value and the initially set Doppler frequency search interval value, the controller generates a control signal for changing the Doppler frequency search start signal by ½ of the initially set Doppler frequency search interval value.

3. The apparatus of claim 1, wherein when at least one among a condition in which a difference between a maximum value and a second greatest value of the calculated satellite signal search values exceeds an initially set first threshold value and a condition in which the maximum value exceeds an initially set second threshold value is satisfied, the determiner determines that the satellite signal has been successfully detected.

4. The apparatus of claim 1, wherein the satellite signal acquiring processor comprises:
a local oscillator which generates a locally oscillating signal whose frequency is shifted, based on the control signals;
a code generator which generates a code signal whose phase is delayed, based on the control signals;
a phase shifter which a phase of a locally oscillating signal generated by the local oscillator;
first and second mixers which respectively mix the locally oscillating signal and the locally oscillating signal whose phase is 90° shifted, with an input signal;
third and fourth mixers which mix signals output from the first and second mixers with a code signal generated by the code generator;
first and second integrators which respectively integrate signals output from the third and fourth mixers for an accumulation section;
first and second square operation units which respectively square values integrated by the first and second integrators; and
a summer which sums values calculated by the first and second square operation units.

5. The apparatus of claim 4, wherein the accumulation section is determined in inverse proportion to a size of the Doppler frequency search interval value.

6. The apparatus of claim 1, wherein if the detection of the satellite signal fails in the satellite signal acquiring operation performed by changing the Doppler frequency search start value, the controller generates control signals for changing the initially set Doppler frequency search interval value and determining the Doppler frequency search start value as an initially set value.

7. An apparatus for acquiring a signal from a satellite system, the apparatus comprising:
a controller which generates control signals for determining a Doppler frequency search start value;
wherein, the controller generates control signals for changing the Doppler frequency search start value while maintaining the Doppler frequency search interval value.

8. The apparatus of claim 7, wherein the controller generates control signals for changing only when an acquisition operation with an earlier Doppler frequency start value fails.

* * * * *